US008064888B2

(12) United States Patent
Lee

(10) Patent No.: US 8,064,888 B2
(45) Date of Patent: Nov. 22, 2011

(54) COMMUNICATIONS SYSTEM THAT PROVIDES USER-SELECTABLE DATA WHEN USER IS ON-HOLD

(75) Inventor: Michael M. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 752 days.

(21) Appl. No.: 11/787,156

(22) Filed: Apr. 12, 2007

(65) Prior Publication Data

US 2008/0254774 A1  Oct. 16, 2008

(51) Int. Cl.
*H04M 3/42* (2006.01)
(52) U.S. Cl. ............. 455/414.1; 715/210; 715/782; 715/234; 715/251; 370/355; 370/352; 379/88.2; 379/88.1
(58) Field of Classification Search .............. 715/210, 715/782, 234, 251; 40/411; 707/5, 104, 707/E17; 455/414; 340/825
See application file for complete search history.

(56) References Cited

U.S. PATENT DOCUMENTS

| 5,875,231 | A * | 2/1999 | Farfan et al. ............. 379/67.1 |
| 6,542,739 | B1 * | 4/2003 | Garner ..................... 455/427 |
| 7,092,698 | B1 * | 8/2006 | Sharp et al. ............ 455/414.1 |
| 7,181,017 | B1 * | 2/2007 | Nagel et al. .............. 380/282 |
| 7,849,154 | B2 * | 12/2010 | Grecco et al. ............. 709/217 |
| 2002/0136384 | A1 * | 9/2002 | McCormack et al. ... 379/215.01 |
| 2003/0112927 | A1 * | 6/2003 | Brown et al. .............. 379/67.1 |
| 2004/0133640 | A1 * | 7/2004 | Yeager et al. ............. 709/204 |
| 2004/0203660 | A1 * | 10/2004 | Tibrewal et al. ......... 455/414.1 |
| 2004/0249650 | A1 * | 12/2004 | Freedman et al. ............. 705/1 |
| 2005/0021713 | A1 * | 1/2005 | Dugan et al. ................ 709/223 |
| 2005/0043060 | A1 * | 2/2005 | Brandenberg et al. ........ 455/558 |
| 2005/0201531 | A1 * | 9/2005 | Kanter et al. ............ 379/88.13 |
| 2005/0249345 | A1 * | 11/2005 | Burg et al. ............ 379/215.01 |
| 2006/0003783 | A1 * | 1/2006 | Fukui et al. ................ 455/517 |
| 2007/0049335 | A1 * | 3/2007 | Haitani et al. ............ 455/556.2 |
| 2008/0254773 | A1 | 10/2008 | Lee |
| 2009/0055220 | A1 * | 2/2009 | Rapaport et al. ............... 705/2 |

* cited by examiner

*Primary Examiner* — Nick Corsaro
*Assistant Examiner* — Mahendra Patel
(74) *Attorney, Agent, or Firm* — Blakely, Sokoloff, Taylor & Zaffman LLP

(57) ABSTRACT

Systems and methods for providing user-selectable data when a user is on hold are provided. A communications system can automatically detect when a user is placed on hold. Additionally, a user can indicate when he/she has been placed on hold. After it has been determined that a user is placed on hold, the system can select adaptive information according to predetermined selection criteria and present that adaptive information to the user. A system can also generate contextual data which is related to the content of a current communication and use that contextual data (in addition to any predetermined selection criteria) to select adaptive information that is relevant to a user's communications. Contextual data can be generated before a user is placed on hold by analyzing a communications signal in order to identify keywords that are based on the content of that communication.

22 Claims, 10 Drawing Sheets

COMMUNICATIONS SYSTEM THAT PROVIDES USER-SELECTABLE DATA WHEN USER IS ON-HOLD

BACKGROUND OF THE INVENTION

In one embodiment, the present invention can relate to communications systems.

Communications systems (e.g., telecommunications systems) often present a user with generic information while the user is on hold. For example, many telecommunications systems will play music or other prerecorded audio while a user is on hold. The music or prerecorded audio is the same for all of the listeners, but each listener may have individual preferences which are not the same. Therefore, there is a need to provide improved communications systems and methods.

SUMMARY OF THE INVENTION

Systems and methods for providing user-selectable data when a user is on hold are provided. A communications system can automatically detect when a user is placed on hold. Additionally, a user can indicate when they have been placed on hold. After it has been determined that a user is placed on hold, the system can automatically select adaptive information according to predetermined selection criteria and present that adaptive information to the user. Alternatively, the system can prompt a user regarding what type of adaptive information the user may prefer to receive.

Adaptive information, as defined herein, can refer to information, presented to a user in accordance with embodiments of the invention, that is dynamic with respect to a communications event. The information is adaptive in that it can be automatically presented at times when the user may otherwise not expect to be presented with information. Adaptive information can be different from traditional static information, which is information that remains fixed or the same (e.g., length of call, name of user at the other node of a connection, and displayed graphic) every time a connection is formed or attempted to be formed with a node. The content of the adaptive information may be specifically tailored to the communications event based on one or more different criteria such as the nodes involved, date, time, user's schedule, user's or the other node's location, and other suitable criteria. Adaptive information can include a user's calendar, past communications between a user and a particular node, advertisements, news, weather, or music. Adaptive information may not necessarily be stored on a user's device. Adaptive information may be stored on a network server or other suitable location and accessed in response to a connection event. Adaptive information may be referred to herein as selected information, presented information, dynamic information or on-hold information.

The present invention can be incorporated into many types of communications systems (e.g., conventional telephone systems, cellular telephone systems, VOIP telephone systems, videoconferencing systems and radio communications systems). For example, cellular telephone systems can present adaptive information when a user is on-hold. Videoconferencing systems are another example of a type of communications system which can incorporate the principles of the present invention.

A user can configure the criteria that a system uses to select the adaptive information that can be presented. When setting up a device, a user can create a profile which determines the type and quantity of adaptive information that a system presents when a user is on hold. For example, a possible user profile can include presenting adaptive information about a person that a user is communicating with when a user is put on hold. Continuing the example, a user profile can include instructions to present national news information after having presented adaptive information about a person the user is communicating with. Another possible user profile can include presenting adaptive information that is relevant to both a person that a user is attempting to contact and an upcoming event on the user's calendar.

In one embodiment, the on-hold information can be selected according to a characteristic of the connection. For example, a system can present adaptive information to a user about someone that they are communicating with (by associating the node with a person or place). Such adaptive information can include, for example, the name of the person's spouse and children, the date of their birthday or their hobbies. The presented information can be related to previous communications with the person that a user is connected with. For example, when a user is connected with someone and put on hold, a communications system can present adaptive information about the last time that the user communicated with that person. A system can also identify any unsuccessful attempts to communicate (e.g., unanswered calls, voicemails, unread emails) with another person and present a user with adaptive information related to those attempts. This adaptive information can prepare a user for the rest of the communication.

The adaptive information can be selected based on a user's calendar. For example, a communications system can remind a user about any upcoming events (e.g., birthdays, doctor appointments) on their calendar. The adaptive information can be selected according to both a user's calendar and the person that the user is communicating with. For example, a communications system can check a user's calendar for any upcoming events (e.g., meetings, birthdays or children's birthdays) which are related to a person that the user is communicating with.

The time that a user is put on hold can affect how the adaptive information is selected. For example, if a user is put on hold early in the morning, the presented information can be a highlight of the events on the user's calendar for that day. Moreover, if the user is put on hold late in the evening, the presented information can be a summary of the day's news or a summary of events scheduled for the next day.

The adaptive information can be selected based on location. In one embodiment, the presented information can be related to the location of a user who is put on hold. For example, if a user is in an area under a severe weather alert, the system can present the weather alert to the user while the user is on hold. In another embodiment, a user who is put on hold can be presented with adaptive information related to the location of the other end of a connection. For example, if a user is communicating with a person who is out of the country, a system can notify the user about that. In yet another embodiment, the presented information can be related to the location of both the user who is put on hold and the other end of a connection. For example, when a user is put on hold, a system can notify the user if they are within a certain proximity to the other end of the connection.

Additionally, communications systems can present general adaptive information that is independent of any characteristics of the connection. For example, a communications system can be configured to present news headlines when a user is on hold. Music is another example of adaptive information that is independent of the connection.

Communications systems can present adaptive information as an advertisement to a user while the user is on hold.

Advertisement space can be sold by system operators and the advertising revenue may be used to lower costs incurred by a user.

Adaptive information that is presented to a user can originate from a device other than a local device. For example, a local device can receive adaptive information from another device (e.g., a server) and present that information to a user while the user is on hold. This architecture can minimize the amount of adaptive information that is stored on the local device.

While adaptive information is being presented, a system can suppress (e.g., mute) data from the connection so that a user can focus on the adaptive information being presented. Alternatively, the system can blend data from the connection with adaptive information that is being presented.

A communications system can present adaptive information until it is determined that the user is no longer on hold. The fact that the user is no longer on hold can be determined automatically by the system or from an input by the user.

In order to automatically determine when a user is on hold or when a user is no longer on hold, a system can analyze data from the connection. For example, in a telecommunications system, a telephone can monitor the received audio signal in order to determine when a user is on hold. Continuing the example, a telephone can be programmed to monitor for a certain sound (e.g. a click) in the received audio which indicates that a user has been placed on hold. Continuing the example further, a telephone can also monitor for one or more frequency components (or lack thereof) in the received audio. The frequency components can indicate when a user is on hold or when a user is not on hold. For example, the audio signals generated by a telephone microphone have particular frequency components that are different from those in audio signals which are generated when a user is placed on hold (e.g., music, pre-recorded information, silence).

When it is determined that the user is no longer on hold, the system can stop the presentation of adaptive information. After stopping the presentation, a system can switch back to presenting data from the connection.

A system can also generate contextual data which is related to the content of a current communication and use that contextual data (in addition to any predetermined selection criteria) to select adaptive information that is relevant to a user's communications. Contextual data can be created by analyzing a communications signal to determine keywords that are based on the content of a communication. In addition to keywords, contextual data can include the number of times each keyword has occurred and the time that a keyword was last used. A system can use the contextual data, in conjunction with the predetermined selection criteria, to select adaptive information which is relevant to a user's communications and, therefore, useful to a user while they are on hold.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION OF THE INVENTION

Commonly assigned Lee U.S. patent application Ser. No. 11/786,848, filed Apr. 12, 2007, entitled "METHOD FOR PRESENTATION OF INFORMATION BEFORE CONNECTION" is hereby incorporated by reference in its entirety.

In the present application, the terms connection, node and on hold are used with respect to communications systems. The word connection is used herein to define any link within a communications system that can transmit data. Each connection can link two or more nodes together. The term node is used herein to define devices that a user can use to access a communications system. In the exemplary analogy of a telecommunications system: a call is a connection and each telephone is a node. The term on hold is used herein to define the condition when a connection between two or more users is in a state of temporary interruption. Such an interruption can be initiated automatically by the system or manually by one of the users. When a user is on hold, the interruption can be at the system level (meaning that the system is no longer configured for users to communicate together) or at the user level (meaning that the system is properly configured, but one of the users is not participating).

There are many instances when a user may be placed on hold. For example, in a telecommunications system, a user can be placed on hold if a third-party attempts to call the other user participating in the call. In another example involving cellular telecommunications system, a user can automatically be placed on hold if the other user's cellular telephone loses its connection to the network.

Figure 1:
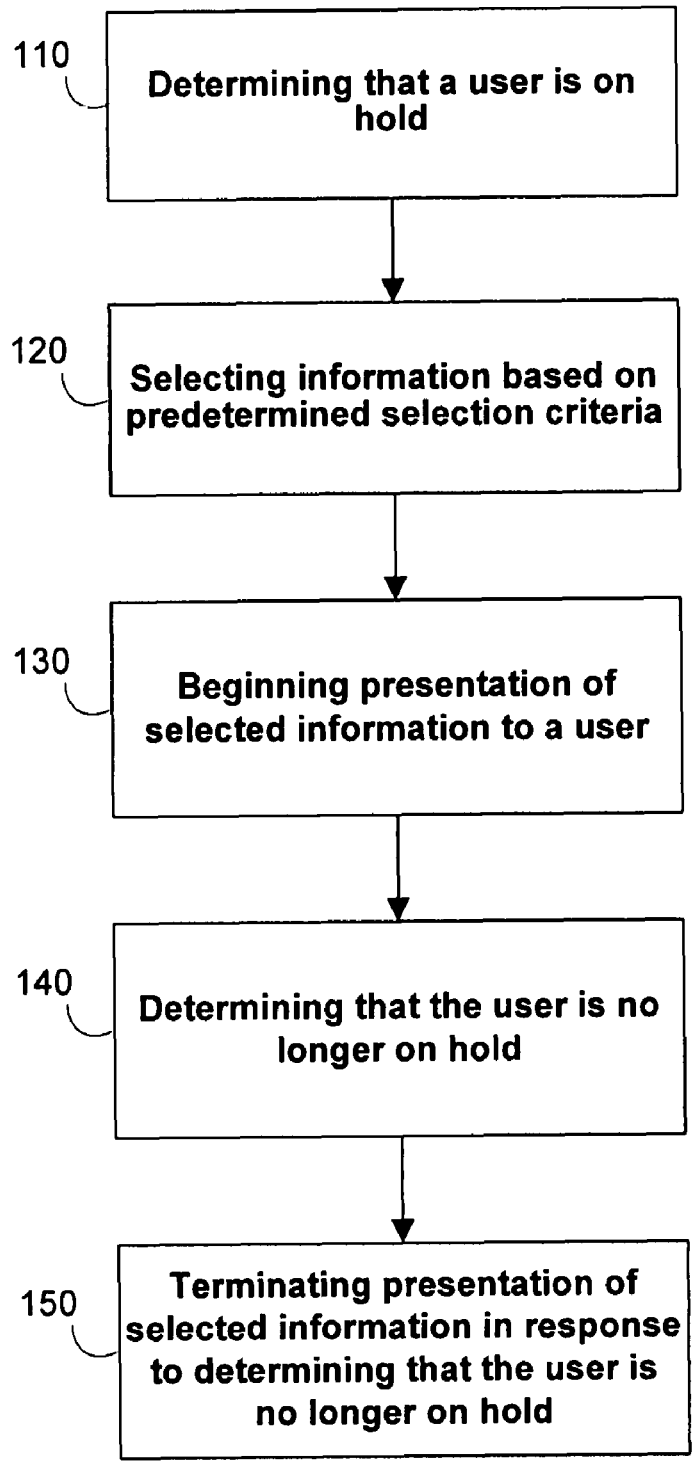
FIG. 1 is a flowchart of an illustrative process for presenting adaptive information in accordance with an embodiment of the present invention.

FIG. 1 shows a flowchart of method 100 for presenting adaptive information when a user is on hold. At step 110, a communications system can determine that a user is on hold. A communications system can automatically determine that a user is on hold by monitoring a received communications signal. Additionally, a communications system can determine that a user is on hold by monitoring a user input (e.g., button or voice-recognition system).

Automatically determining that a user is on hold can be accomplished through various techniques in accordance with embodiments of the present invention. In one embodiment, a communications system can transmit status data as part of a communications signal. Status data can include adaptive information related to a connection, such as, for example, if one of the users has put the other user on hold. Status data can be used internally by a system, but not presented to a user. For example, in a telecommunications system, status data can be included in transmissions between devices without interfering with the audio signals that a user hears.

A communications system can, for example, determine that a user is on hold by analyzing a communications signal. A communications system can monitor a communications signal (e.g., audio signal, video signal or bit sequence) to determine if a particular data sequence (e.g., sound, image or bit pattern) occurs that is indicative of a user being on hold. For example, in a telecommunications system, a beep of a certain tone can indicate that a user is being put on hold. When a user participating in a connection puts the other user on hold, a communications system can transmit a predetermined data sequence to the other user.

A communications system can also determine that a user is on hold by determining the lack or absence of a data sequence (e.g., sound, image or bit pattern) in a communications signal. A communications system can exploit the fact that there may be certain data sequences which are inherently part of a communications signal during an active connection (i.e., while not on hold). The data sequences used to identify when a user is or is not on hold can include predetermined frequency components of a communications signal. For example, a telecommunications system can determine that a user is on hold by identifying the absence of certain frequencies which are inherently created when an audio signal is generated from a telephone microphone.

It is understood that the techniques described herein for determining that a user is on hold, including both manual and automatic techniques, can be used in combination with each other. By combining the techniques, any deficiencies (e.g., inability to identify certain on hold situations) of a particular technique can be overcome by using another technique in combination with the deficient technique. Therefore, a system can use more than one technique to determine that a user is on hold.

At step 120, a communications system can select adaptive information based on predetermined selection criteria. How adaptive information is selected can vary depending on many criteria, including characteristics or aspects of the connection. For example, adaptive information can be selected according to who/what a user is communicating with. In order to identify who/what a user is communicating with, a system can affiliate different node references (e.g., telephone number, IP addresses, radio frequencies) with different identities (e.g., people or places). This can be done automatically using information such as publicly available directory listings. Alternatively, nodes can be manually affiliated with people and places through user input.

The predetermined criteria used to select adaptive information can be chosen by a user when configuring a device. A detailed description of possible criteria used to select adaptive information can be found below in the discussion relating to FIGS. 3 and 4A-4D. If no selection criteria has been previously chosen, a default criteria can be used to select adaptive information.

Alternatively, a communications system can prompt a user to select what adaptive information to present. Rather than automatically selecting adaptive information according to predetermined criteria, the system can prompt a user about what adaptive information the user may like. The prompt can be either a verbal or graphical prompt, and the user can respond through a suitable input device (e.g., button or voice recognition system).

At step 130, a communications system can begin the presentation of selected information to a user. Selected information can be presented using, for example, audio or graphical representations of the adaptive information. In one embodiment, adaptive information stored as symbols (e.g., numbers, letters, words) can be converted to audio signals (e.g., using a voice emulation algorithm) and played through one or more speakers. In an alternative embodiment, adaptive information can be stored as audio signals which are accessed and played through one or more speakers.

Adaptive information can also be presented using graphical representations. Graphical representations of adaptive information can be used separately from or in combination with audio signals. For example, a device can display a picture of the person a user is communicating with while also providing important facts about that person through an audio signal.

The presentation of adaptive information can be combined with communication data. Such a combination may assist a user in identifying when they are no longer on hold. A system can combine audio communication data and audio adaptive information into one audio signal. When combining the two types of data, a system can adjust the volume of the different audio signals relative to each other. For example, the volume of communications data can be lowered so that a user can focus on the adaptive information being presented. A system can combine graphical communication data and graphical adaptive information into one graphical display for presentation to a user. When making such a combination, a system can divide a graphical presentation area (e.g., a display screen) into multiple panels and each panel can be used for each type of data. Alternatively, a system can overlay the two types of data onto one graphical panel. When overlaying the two types of data, one can be made semi-transparent so that the other type of data can be seen. For example, selected graphical information can be semi-transparent and overlaid on top of graphical communication data.

Instead of combining selected information and communications data, a system can block communications data from being presented to a user. For example, a telephone system can mute incoming call audio when it is presenting adaptive information to a user. This mode of presentation can be advantageous because it allows a user to focus on the selected information.

A system can present selected information to only one of the users participating in a connection. Alternatively, a system can present selected information to two or more users in a connection. It can be advantageous for a system to present adaptive information to multiple users because the users may want to discuss the adaptive information in their communications. In order to present adaptive information to more than one user, a system can transmit data to each user participating in a connection.

At step 140, a communications system can determine that a user is no longer on hold. A communications system can use the same techniques described above in connection with step 110 to determine that a user is no longer on hold.

A communications system can monitor a user input to manually determine that a user is not on hold. For example, a user may press a button when that user is no longer on hold. It is understood that, in order for a user to identify when they are no longer on hold, adaptive information can be presented without preventing a user from seeing or hearing communications data.

There are several techniques that a communications system can employ to automatically determine that a user is not on hold in accordance with embodiments of the present invention. A communications system can monitor status data (as discussed above) which can indicate whether or not a user is on hold. Additionally, a communications system can analyze a communications signal to determine if a user is no longer on hold. A communications system can identify a particular data sequence which shows that a user is no longer on hold. For example, in a telecommunications system, if a system knows that a user is already on hold and it hears a beep of a certain tone, that system can use the beep to determine that the user is no longer on hold. A system can also identify the presence or absence of certain frequency components (as discussed above) which may be indicative of when a user is no longer on hold.

It is understood that a combination of techniques can be used to determine when a user is no longer on hold. For example, many of the same techniques for determining when a user is on hold may be used to determine when a user is no longer on hold.

At step 150, a communications system can terminate presentation of selected information in response to determining that the user is no longer on hold. In one embodiment, the presentation of adaptive information can be instantly terminated when a system has determined that a user is no longer on hold. Such an instant termination can be followed by, for example, an immediate switch to presenting data from the connection. For example, a cellular telephone can switch immediately from the presentation of adaptive information to an active call that is no longer on hold.

In other embodiments, a communications system can notify a user that it is terminating the presentation of adaptive information and switching to the connection. Such a notification can, for example, be an audio signal (e.g., beep, tone, pre-recorded or emulated voice), a graphical signal (e.g., text, an icon, an indicator light) or a tactile signal (e.g., device vibrations).

In another illustrative embodiment, a communications system can delay terminating the presentation of adaptive information in order to complete the presentation of a unit of adaptive information. For example, if a system determines that a connection is no longer on hold, it can finish presenting a unit (e.g., word, sentence, intelligible block) of adaptive information before terminating the presentation. To finish presenting information, a system can prevent a user's on hold condition from ending. This can effectively put a node of the system that the user is connected with on hold. When a system has determined that a user is no longer on hold but is still presenting adaptive information, the system can, for example, provide an audio or visual message to the other node that signifies that the user is currently busy (e.g., an audio signal asking the other node to wait while the user is contacted). Additionally, a system can notify the user that the other node has returned to the connection with an audio or visual indicator (e.g., a subtle beep or icon that doesn't interfere with the presentation of adaptive information).

It is understood that in method 100, adaptive information can be selected before it is determined that a user is on hold in accordance with the principles of the present invention. This change can be shown in FIG. 1 by reversing the order of steps 110 and 120. The amount of time that a system takes to select adaptive information may be significant, especially if complex selection criteria are used. By selecting adaptive information before a system has determined that a user is on hold, the system may be able to more quickly begin the presentation of adaptive information once the user is on hold. If a connection ends without a user going on hold, the adaptive information selection may be released without having ever been presented.

Figure 2:
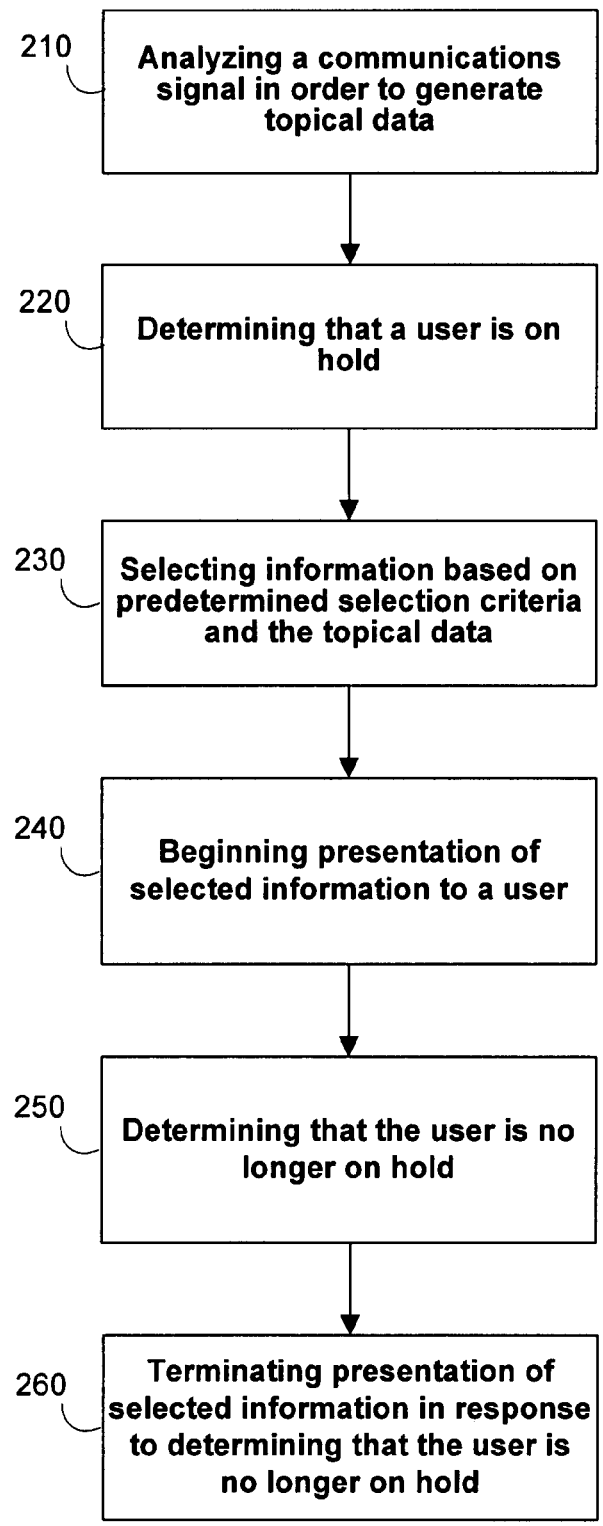
FIG. 2 is a flowchart of another illustrative process for presenting adaptive information in accordance with an embodiment of the present invention.

FIG. 2 shows a flowchart of method 200 for presenting adaptive information when a user is on hold. Method 200 includes analyzing a communications signal prior to a user being placed on hold in order to further enhance the criteria used to select data that is presented to a user while that user is on hold. The analysis can be focused on determining the topic of a communication that a user is engaged in and generating contextual data that is reflective of that. The communications system can then use this contextual data to select and present adaptive information that is relevant to the user's current communication.

At step 210, a communications system can analyze a communications signal to generate contextual data. There are various ways a system can analyze a signal. How a communications system analyzes a signal may depend on the type of signal. For example, a voice-recognition system can be used to convert an audio signal into a stream of text and a keyword recognition system can then be used to identify keywords in the stream of text. A communications signal that contains a stream of text data can be directly processed by the keyword recognition system. A video or image signal can be processed by an optical character recognition system which can output a stream of text to a keyword recognition system. A keyword recognition system can selectively filter out common words (e.g., a, an, the, of) which are not typically indicative of the subject of a communication.

Independent from the type of signal being read, the resulting keywords can be used to create contextual data which can be reflective of the subject of a user's conversation or communication. Also included in the contextual data can be occurrences data and timestamp data (both affiliated with each keyword). The occurrences data can indicate how many times a particular keyword has been used, and timestamp data can indicate when the particular keyword was last used. The occurrences data can be a count of the number of times that a keyword has been used or a percentage of the keyword's use as it compares to the use of other keywords. The contextual data can be stored either locally or remotely in a communications system.

It is understood that the analysis of data in order to generate contextual data and keywords is well known in the art, and any of the known techniques can be used to generate contextual data from a communications signal without deviating from the spirit of the present invention.

At step 220, a communications system can determine that a user is on hold. Step 220 is substantially similar to step 120 of method 100, and the above description of step 120 can be applied to step 220.

At step 230, a communications system can select adaptive information based on predetermined selection criteria and the contextual data. The predetermined selection criteria is described below in connection with FIGS. 3, 4B-4D and 5.

A communications system can select adaptive information using contextual data in addition to predetermined selection criteria. In one embodiment of the present invention, contextual data can be used to limit the scope of adaptive information before predetermined selection criteria is used to select adaptive information. Alternatively, the predetermined selection criteria can be used first to limit the scope of adaptive information before contextual data is used to select adaptive information.

Contextual data can include indicators of the relevancy of each keyword to the current communication that a user is participating in. Relevancy indicators can be based on the number of occurrences of each keyword and how recently each keyword was used in the communication. For example, a system can be configured to consider only keywords that have been used more than a certain number of times when searching for relevant adaptive information. Adding to the previous example, a system can be configured to only consider keywords that have been used in the last five minutes of a communication.

When selecting adaptive information, a set of relevant keywords (e.g., keywords with relevancy indicators above a certain level) can be used to identify what adaptive information may be most relevant to a communication that a user is participating in. The set of relevant keywords can be used to search adaptive information that a system has access to. For example, the set of relevant keywords can be used when searching a user's calendar, a user's contact list, a user's previous correspondence and current news. This type of relevancy search can enhance the adaptive information that is presented to a user while they are on hold.

At step 240, a communications system can begin presentation of selected information to a user. Step 240 is substantially similar to step 130 of method 100, and the above description of step 130 can be applied to step 240.

At step 250, a communications system can determine that the user is no longer on hold. Step 250 is substantially similar to step 140 of method 100, and the above description of step 140 can be applied to step 250.

At step 260, a communications system can terminate the presentation of selected information in response to determining that the user is no longer on hold. Step 260 is substantially similar to step 150 of method 100, and the above description of step 150 can be applied to step 260.

It is understood that in method 200, adaptive information can be selected before it is determined that a user is on hold in accordance with the principles of the present invention. This change can be shown in FIG. 1 by swapping the place of steps 220 and 230. The amount of time that a system takes to select adaptive information may be significant, especially if complex selection criteria are used. By selecting adaptive information before a system has determined that a user is on hold, the system may be able to more quickly begin the presentation of adaptive information once the user is on hold. Because the contextual data may change as a communication progresses, the selected information can be periodically or continuously reevaluated during a connection in order to confirm that the selected information still corresponds to the contextual data. If a connection ends without a user going on hold, the selected information may be released without having ever been presented.

Figure 3:
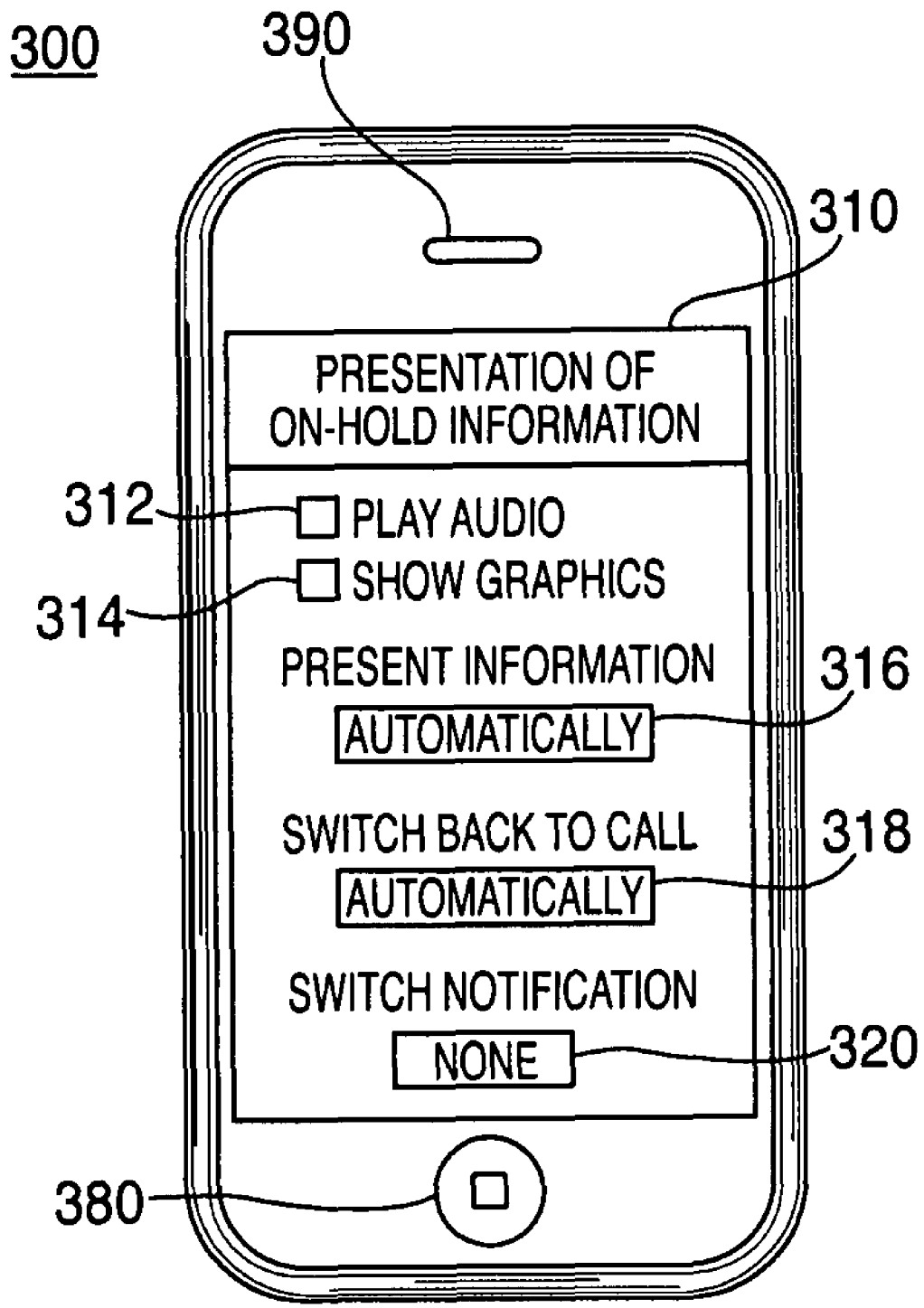
FIG. 3 is a simplified illustration of a screenshot of a communications device in accordance with an embodiment of the present invention.

FIG. 3 includes a sample screenshot of a user interface of device 300 that is part of a communications system. In one embodiment, device 300 can be a cellular telephone that is part of a cellular telephone system. In other embodiments, device 300 can be any other type of communications device (e.g., computer or radio) that is part of a communications system (e.g., the internet or a network of devices).

The user interface of device 300 can be operable to configure the presentation of adaptive information to a user while a connection (e.g., a telephone call) is on hold. Device 300 can include screen 310 which can be a touch-screen that is operable to both display adaptive information and receive user input. Although device 300 is shown with a touch-screen, it is understood that other input devices can be used without deviating from the spirit of the present invention. Device 300 can also include speaker 390 which can generate audio signals to output adaptive information to a user and microphone 380 which can receive audio input from a user.

Screen 310 can include inputs 312, 314, 316 and 318 which a user can set according to their preferences. Input 312 can be a checkbox that determines whether adaptive information is audibly presented to a user when a user is on hold. Input 314 can be a checkbox that determines whether adaptive information is graphically displayed while a user is on hold. Both inputs 312 and 314 can be selected at the same time. In this case, a user may receive adaptive information both audibly and graphically while they are on hold. In one embodiment, the adaptive information presented audibly can be different from the adaptive information prsesented graphically. For example, a graphical display may present a weather forecast while news headlines are presented through an audio signal. In other embodiments, the audio and graphical signals can be redundant. For example, a list of news headlines can be presented using both graphical and audio signals.

Inputs 316, 318 and 320 can be used to configure when and how a system changes from presenting adaptive information to an active connection (i.e., a connection that is not on hold). Input 316 can be set to control how a system determines that a user is on hold and starts presenting adaptive information. Input 316 can control whether or not the system automatically identifies when a user is on hold. For example, input 316 can be set so that a communications system actively monitors connections in order to determine if a user is on hold. Alternatively, input 316 can be set so that a communications system can determine that a user is on hold by receiving an input from a user (e.g., a user pushing a button).

Input 318 can be set to control how a system determines that a user is no longer on hold and resumes presenting data from an active connection. Input 318 can control whether or not the system automatically determines that a user is no longer on hold. For example, input 318 can be set to monitor connections to determine when a user is no longer on hold. Alternatively, input 318 can be set so that a communications system can determine when a user is no longer on hold by receiving an input from a user (e.g., a user pushing a button).

Input 320 can be set to configure a communications system to notify a user when it switches from an active connection to presenting adaptive information or vice-versa. Input 320 can, for example, be set to notify a user with a beep, a voice message or by vibrating a communications device. Alternatively, input 320 can be set to provide no notification at all.

FIGS. 4A-4D include sample screenshots of user interfaces of device 400. Device 400 can be part of a communications system that is operable to present adaptive information to a user in accordance with an embodiment of the present invention. In one embodiment, device 400 can be a cellular telephone that is part of a cellular telephone system. In other embodiments, device 400 can be any other type of communications device (e.g., computer or radio) that is part of a communications system (e.g., the internet or a network of devices).

The user interface of device 400 can be operable to configure the criteria used to select adaptive information which can be presented to a user while the user is on hold. Device 400 can include screen 410 which can be a touch-screen that is operable to both display adaptive information and receive user input. Although device 400 is shown with a touch-screen, it is understood that other input devices can be used without deviating from the spirit of the present invention. Device 400 can also include speaker 490 which can generate audio signals to output adaptive information to a user and microphone 480 which can receive audio input from a user.

Figure 4A:
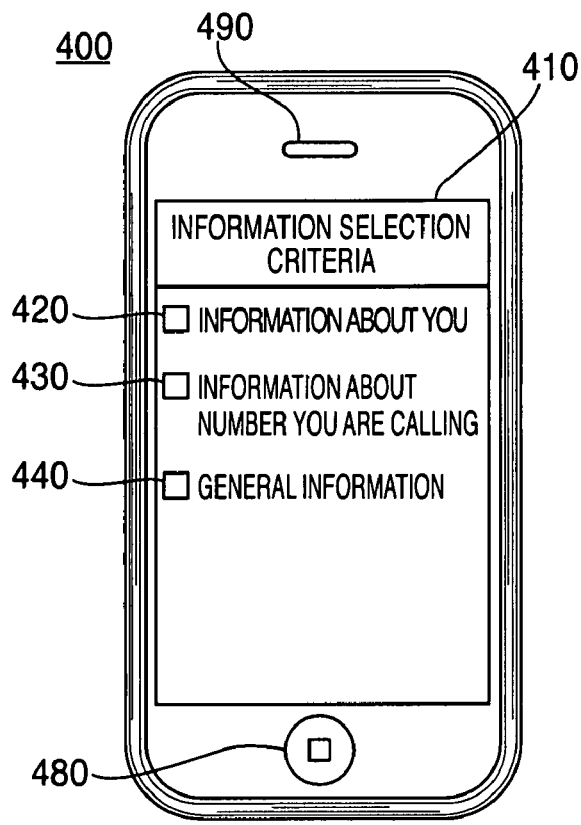
FIGS. 4A-4D are simplified illustrations of other screenshots of a communications device in accordance with an embodiment of the present invention.

FIG. 4A includes a screenshot of a user interface that can be used to select exemplary categories 420, 430 and 440 of adaptive information. The interface shown in FIG. 4A can allow a user to select different categories and navigate between the options within each category. In addition to navigating the categories, the interface shown in FIG. 4A can be used to rank each category with respect to the other categories. For example, the categories can be ranked by assigning them numbers indicative of their importance or by reordering the list in order of importance.

Figure 4B:
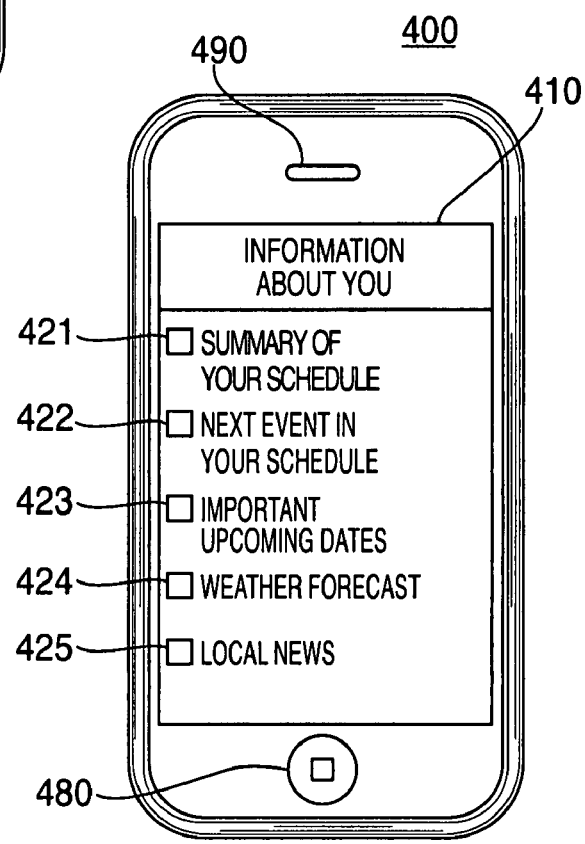
Figure 4C:
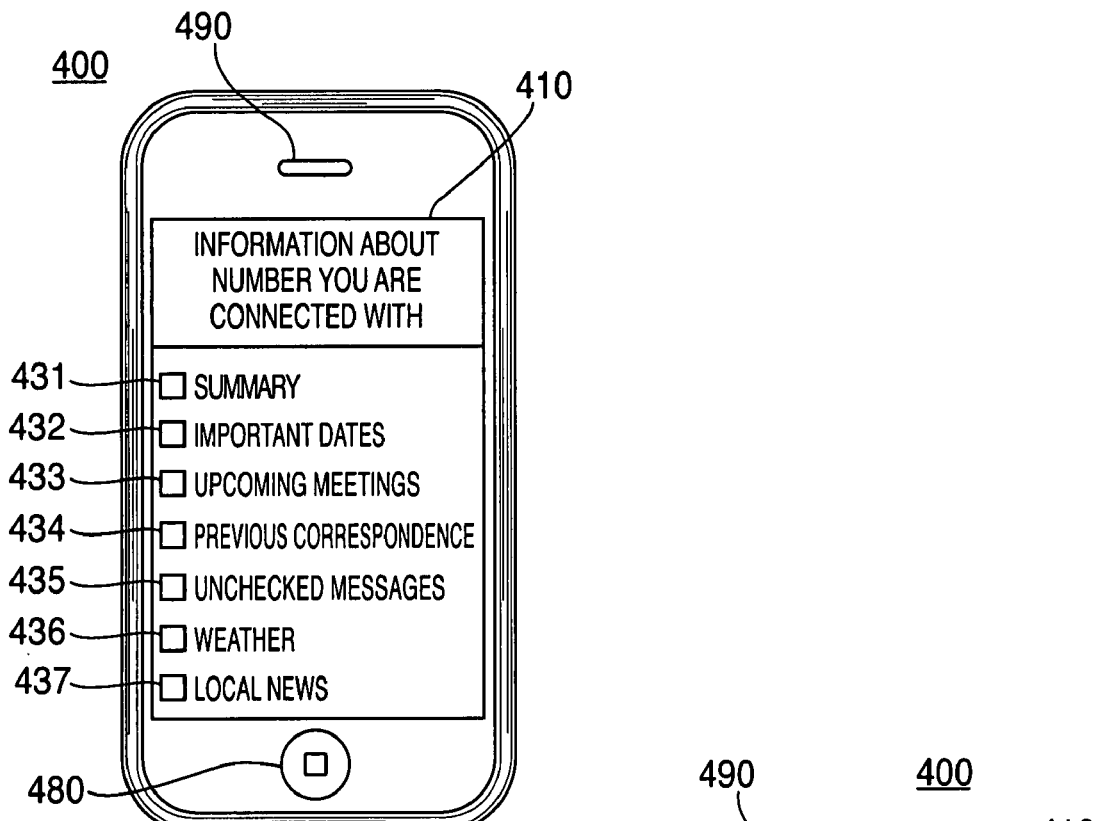
Figure 4D:
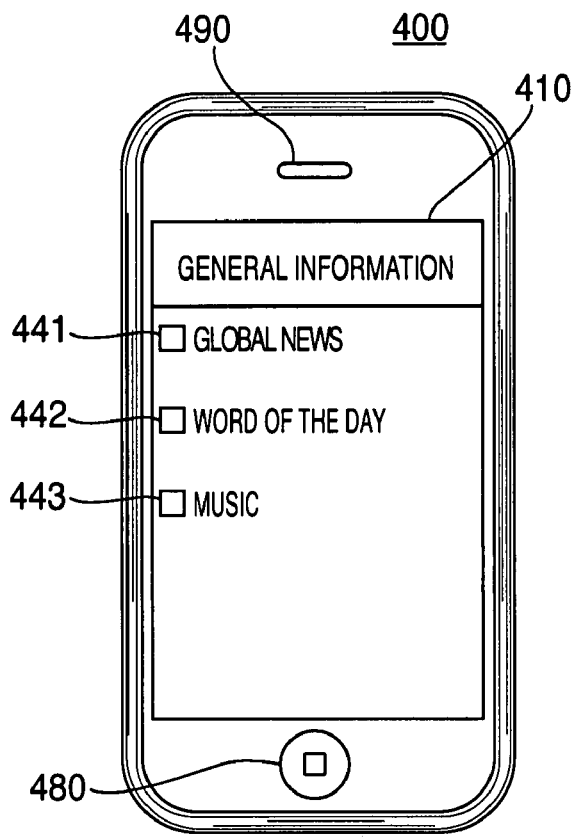
Figure 5A:
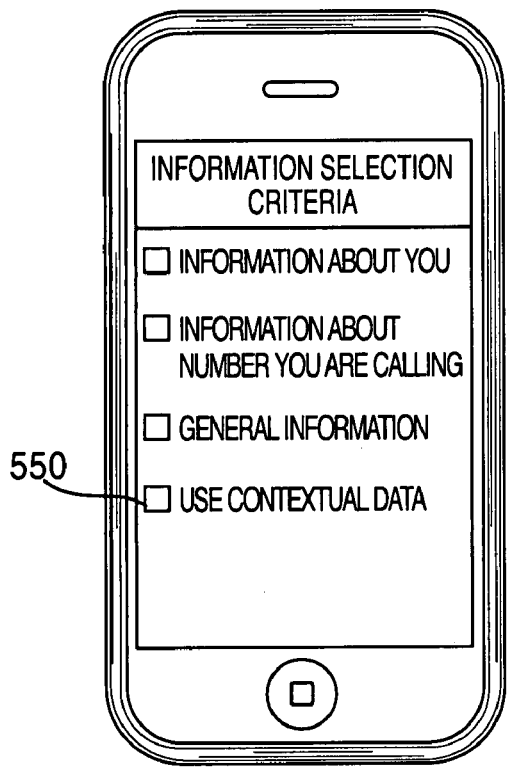
FIG. 5A is a simplified illustration of another screenshot of a communications device in accordance with an embodiment of the present invention.

FIG. 5A includes a screenshot of a user interface of device 500. The user interface shown in FIG. 5A can be used to select exemplary categories in the same manner as the user interface of FIG. 4A. Device 500 can include all of the features described in connection with device 400 of FIGS. 4A-4D, as well as the capabilities to identify and use contextual data when selecting adaptive information in accordance with method 200 of FIG. 2. Device 500 includes input 550 that can be used to control the use of contextual data when selecting adaptive information. Input 550 can be a checkbox that a user can select to instruct device 500 to use contextual data when selecting adaptive information.

Category 420 can correspond to types of adaptive information that are based on the user who is put on hold. FIG. 4B includes a screenshot of a user interface that can correspond to category 420 and includes, for example, inputs 421, 422, 423, 424 and 425. Input 421 can be used to select a summary of a user's calendar. Input 422 can be used to select a detailed description of the next event in a user's calendar. Input 423 can be used to select important upcoming dates (e.g., spouse's and children's birthday, anniversaries, deadlines). Input 424 can be used to select the weather forecast in a user's area. Input 425 can be used to select local news for a user's area.

Category 430 can correspond to types of adaptive information that are based on the other end of a connection (e.g., the party which put a user on hold). FIG. 4C includes a screenshot of a user interface that can correspond to category 430 and includes, for example, inputs 431, 432, 433, 434, 435, 436 and 437. Input 431 can be used to select a summary of adaptive information about the other end of a connection. Input 432 can be used to select upcoming dates on a user's calendar which involve the other end of a connection. Input 433 can be used to select upcoming events or meetings on a user's calendar which include the other end of a connection. Input 434 can be used to select adaptive information about previous communications between a user and the other end of a connection. Input 435 can be used to select unchecked messages or data that a user may have received from the other end of a connection. Input 436 can be used to select weather conditions (current or forecasted) at the other end of a connection. Input 437 can be used to select news that is local to the other end of a connection.

Category 440 can correspond to types of general adaptive information (e.g., global news). Such general adaptive information can be independent of the user who is put on hold or the other end of the connection. FIG. 4D includes a screenshot of a user interface that can correspond to category 440 and includes, for example, inputs 441, 442 and 443. Input 441 can be used to select global news. Input 442 can be used to select a "word of the day" or other similar adaptive information. Input 443 can be used to select music. It is understood that there are many types of general adaptive information that a user can select from and that inputs more detailed than those shown in FIG. 4D can be used. For example, a user can choose specific collections of music that may be based on artist, genre or play list.

It is also understood that, in some embodiments, music and news can be adaptive information that is dependent of one or more characteristics of a connection being formed. For example, a communications system can be configured to present news based on a user's location or the other node's location. In another example, a communications system can be configured to present music based on the identity of the other node.

The types of adaptive information described above are examples of adaptive information that can be presented while a user is on hold. It is understood that other types of adaptive information can be presented without deviating from the spirit of the present invention.

Each of the inputs shown in FIGS. 4B-4D can be selected to instruct a communications system to include that type of adaptive information as available for selection in the selection criteria. Such a selection scheme can be implemented by, for example, placing user configurable check-boxes in front of each input. In another embodiment, a user can assign a ranking to each of the inputs shown in FIGS. 4B-4D. This can be implemented by allowing a user to, for example, assign a rank number to each input or reorder the list of adaptive information according to importance. A user can also assign rankings to the different categories 420, 430 and 440 of adaptive information shown in FIG. 4A. A communications system can use these rankings to determine the order to present adaptive information.

In addition to a user's ranking of importance, there are many additional factors which a communications system can use to select what adaptive information to present. The time when a connection is put on hold can affect what adaptive information is selected. For example, a connection which is put on hold early in the morning can be accompanied by a summary of a user's calendar for that day. The time at the other end of a connection can also have an effect. For example, if a connection between two time zones is put on hold, the system can notify a user put on hold what the local time is at the other end of the connection.

Location can also be a factor in what adaptive information a communications system selects to present to a user. The location of a user put on hold can be used to convey relevant adaptive information which is specific to that location. For example, a communications system can present local news and weather to a user. The location of the other end of a connection can also be used to select what adaptive information is presented to a user who is put on hold. For example, it can be advantageous for a user put on hold to know what the local news and weather is at the other end of the connection.

Communications systems can also keep a log of what adaptive information has already been presented to a user and when it was presented. This data can be used so that a system does not present redundant information to a user within a short period of time. For example, a communications system may be configured to never present the same piece of adaptive information twice within a single week. This log can also be used so that each successive connection to the same node leads to increasingly more detailed adaptive information.

A communications system can select adaptive information differently when a user is connected with specially identified nodes. A user can identify specific nodes and define different selection criteria to use when connected with those nodes. For example, a user can identify all of the nodes that are associated with their family and configure a system to only present adaptive information about upcoming birthdays when a connection with those nodes is on hold. Continuing the example, if the user is put on hold and there is no adaptive information about an upcoming birthday related to the node that a user is connected to, the system can present general adaptive information such as news.

In accordance with an embodiment of the present invention, a communications system can present advertisements while a user is on hold. In the present application, the term advertisement is used to define any media which may be used for promoting a product or service. In addition, third parties may pay to have their advertisements provided during on-hold events. Advertisements can include audio signals, images, videos or a combination of the three formats. Advertisements can be sold to create income for the operator of the communications system. In order to target more promising potential customers, advertisements can be selected based on a variety of factors which are described below. These types of targeted advertisements may be more desirable than generic advertising.

Advertisements can be selected for presentation according to a characteristic of the connection. Advertisement selection can be based on the person or place that a user is connected with. For example, if a user is connected with a place that sells a certain type of product and is put on hold, a system can present an advertisement for another place that sells the same type of product.

Advertisement selection can also be based on a user's location. Advertisements can be selected based on, for example, nearby businesses, the weather at the user's location or local news for the user's location. For example, a system can present advertisements for businesses that are located near a user. In another example, a system can present advertisements for ski resorts if it is snowing or predicted to snow at the user's location.

Advertisements can also be selected according to a user's previous activities. By analyzing a user's past actions, a system can select advertisements which are likely to be relevant to a user and the types of products they buy. Systems can present certain advertisements to only the users which fulfill a predetermined criteria for that advertisement.

A communications system can be configured so that a user cannot manually override the presentation of an advertisement. If a system is configured in this manner, a system can guarantee that advertisements will be presented which may make the advertisements more valuable.

A system can keep a log of which advertisements have been presented to which users. This log can be used to sell advertisements according to the number of views. Additionally, this log can be used to determine how many advertisements have been presented to a user, and a system can grant that user credits which can be used to lower costs incurred by the user.

The adaptive information presented by a communications system can be stored anywhere in that system. In one embodiment, adaptive information can be stored in the local device and presented to a user directly from that device. Alternatively, adaptive information can be stored in a central device which is part of the communications system. Such a central device can share the adaptive information with local devices when requested to. It can be advantageous to store any redundant information on a central device in order to minimize redundant storage in a system. Therefore, a combination of storage locations can be used to store the adaptive information that is presented to a user. For example, general adaptive information (e.g., news, weather forecasts) that isn't user-specific can be stored on a central device (e.g., a server) while user-specific adaptive information (e.g., a user's calendar) can be stored on a local device that is associated with that user. This example shows one way to consolidate information which is common to a majority of users and reduce redundant storage in a system.

The adaptive information presented in accordance with embodiments of the invention is adaptive or dynamic in that it is not limited to being the same information that is repeatedly displayed each time a connection is initiated. This is in contrast to prior art communications systems that display the same graphic, animation sequence, or name of the end point each time a connection is initiated. Embodiments of the present invention go above and beyond such conventional presentations of information. In addition to the embodiments discussed herein, the presented information may be derived from information sources that are not needed by the communications system to conduct a communications event (e.g., a call). For example, the origin may be a device operating with an operating system, which may serve as a "backbone" for supporting applications. One such application (referred to as a communications applications) may be responsible for executing communications events. Another application may include a calendar program. When the communications event is initiated, the communications program can access data from the calendar program (e.g., upcoming meeting information with the involved nodes) and present it. This example illustrates that the dynamic information can be cross-application derived information.

As another example, the dynamic information can be cross-platform derived information. That is, the origin device may present information stored remotely on another device (e.g., a server in communication with the communications system or a device at the other node of the connection). The cross-platform adaptive information may be retrieved and presented in real-time in connection with a communication event. In another approach, the cross-platform adaptive information may be retrieved remotely and stored (e.g., either temporarily or permanently) and retrieved from local storage on-demand.

Figure 6:
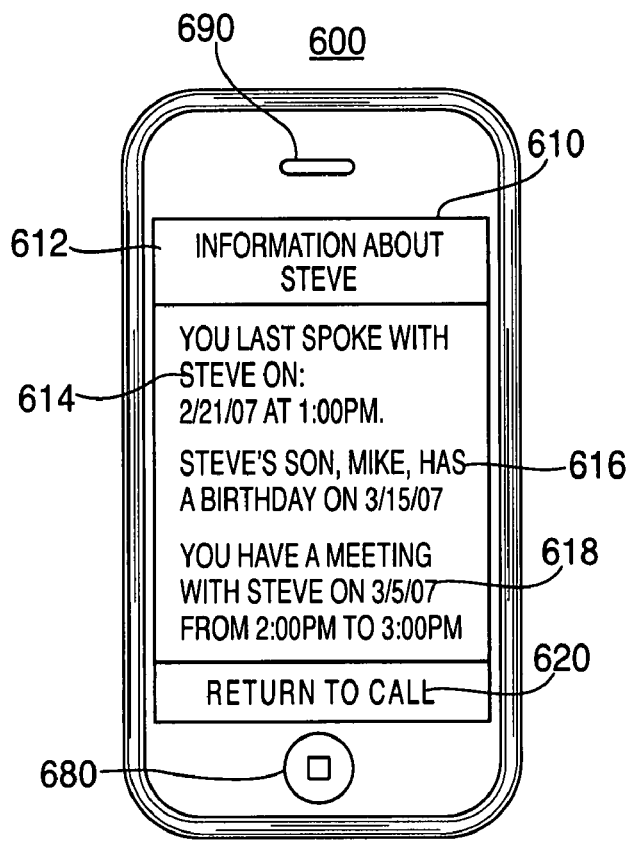
FIG. 6 is a simplified illustration of another screenshot of a communications device in accordance with an embodiment of the present invention.

FIG. 6 shows a sample screenshot of a user interface of device 600 that is part of a communications system. In one embodiment, device 600 can be a cellular telephone that is part of a cellular telephone system. In other embodiments, device 600 can be any other type of communications device (e.g., computer or radio) that is part of a communications system (e.g., the internet or a network of devices).

The user interface of device 600 can be operable to present adaptive information to a user while the user is on hold. Device 600 can include screen 610 which can be a touch-screen that is operable to both display adaptive information and receive user input. Although device 600 is shown with a touch-screen, it is understood that other input devices can be used without deviating from the spirit of the present invention. Device 600 can also include speaker 690 which can generate audio signals to output adaptive information to a user and microphone 680 which can receive audio input from a user.

Screen 610 can include outputs 612, 614 and 616 which display adaptive information about a node that a user is connected with while the user is on hold. Output 612 can include a title of the type of adaptive information screen 610 is displaying. Output 614 can include the time when a user last communicated with the node that they are connected with. Output 616 can include any upcoming dates which are related to the node that a user is connected with. Output 618 can include any upcoming events in a user's calendar that are related to the node that a user is connected with.

While outputs 612, 614 and 616 can graphically display adaptive information to a user, speaker 690 can also audibly display adaptive information to a user while the user is on hold. Speaker 690 can emit an audio signal that is related to the adaptive information presented on screen 610. For example, the adaptive information on screen 610 can be processed by a voice-emulation system (not shown) and the resulting audio signal can be emitted from speaker 690. Alternatively, speaker 690 can emit an audio signal that is unrelated to the adaptive information presented on screen 610. For example, speaker 690 can present an audio signal containing the day's news headlines while screen 610 presents adaptive information related to the person that a user is connected with. Speaker 690 can also emit communications data received by device 600 so that a user can tell when they are no longer on hold.

It is understood that additional types of adaptive information which may be different from those shown in FIG. 6 can be presented to a user without deviating from the spirit of the present invention. Moreover, the types of adaptive information shown in FIG. 6 are the result of exemplary selection criteria that can be set using the user interface shown in FIGS. 4A-4D.

Screen 610 can also include input 620 which a user can select to stop the presentation of adaptive information and return to the active connection. In addition to using input 620, a user can speak input commands into microphone 680 to stop the presentation of adaptive information and return to the active connection. A voice-recognition system (not shown) can process user input received from microphone 680.

Figure 7:
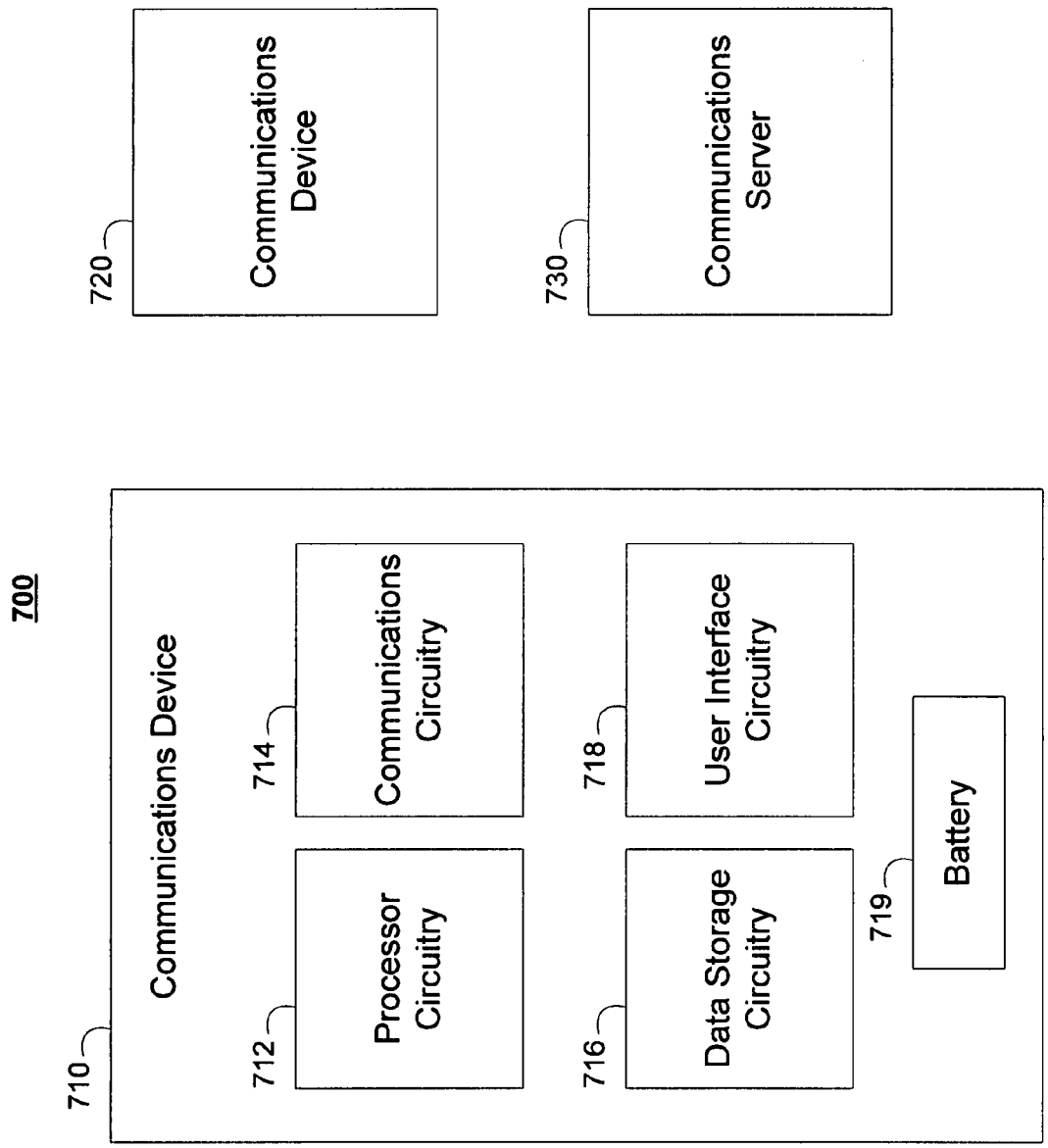
FIG. 7 is a simplified schematic diagram of a communications system in accordance with an embodiment of the present invention.

FIG. 7 includes communications system 700 in accordance with an embodiment of the present invention. System 700 can include local device 710, local device 720 and server 730. Devices 710 and 720 can form connections which allow data to pass between the devices. Devices 710 and 720 can be, for example, cellular telephones or mobile computers. Server 730 can facilitate communications between local devices 710 and 720. Server 730 can plan and route connections between device 710 and device 720. Server 730 can also store adaptive information that is transmitted to device 710 or device 720 for presentation while a user is on hold. In another embodiment, device 710 can connect directly with device 720 without using server 730. It is understood that system 700 can include more devices and servers in addition to those shown in FIG. 7.

Device 710 can include processor circuitry 712, communications circuitry 714, data storage circuitry 716, user interface 718 and battery 719. Processor circuitry 712 can coordinate the functions of device 710. Processor circuitry 712 can include, for example, an ARM processor. Processor circuitry 712 can be electrical coupled with communications circuitry 714, data storage circuitry 716, user interface circuitry 718 and battery 719. Processor circuitry 712 can determine if a user is on hold by, for example, monitoring signals from communications circuitry 714 or user interface circuitry 718.

Communications circuitry 714 can be a system-on-a-chip (SoC) circuit which handles all of the communications device 710 has with device 720 or server 730. Communications circuitry 714 can initiate and finalize connections with other devices. Communications circuitry 714 can monitor communications data to determine when a user is on hold.

Data storage circuitry 716 can store adaptive information in device 710 and can retrieve stored adaptive information at a later time. Data storage circuitry 716 can include, for example, a magnetic disk or flash memory. Data storage circuitry 716 can also store user inputs regarding selection criteria used to select adaptive information.

User interface circuitry 718 can output adaptive information to a user and receive user input. User interface circuitry 718 can include, for example, an audio speaker operable to output sound, a microphone operable to receive user voice inputs and a touch-screen display operable to output graphics and receive user inputs. Alternatively, user interface circuitry 718 can include a display screen operable to output graphics and buttons operable to receive user inputs. User interface circuitry 718 can accept user input that indicates whether or not the user is on hold.

Device 720 can be capable of the same functions of device 710 and can include all of the elements shown-within device 710.

Figure 8:
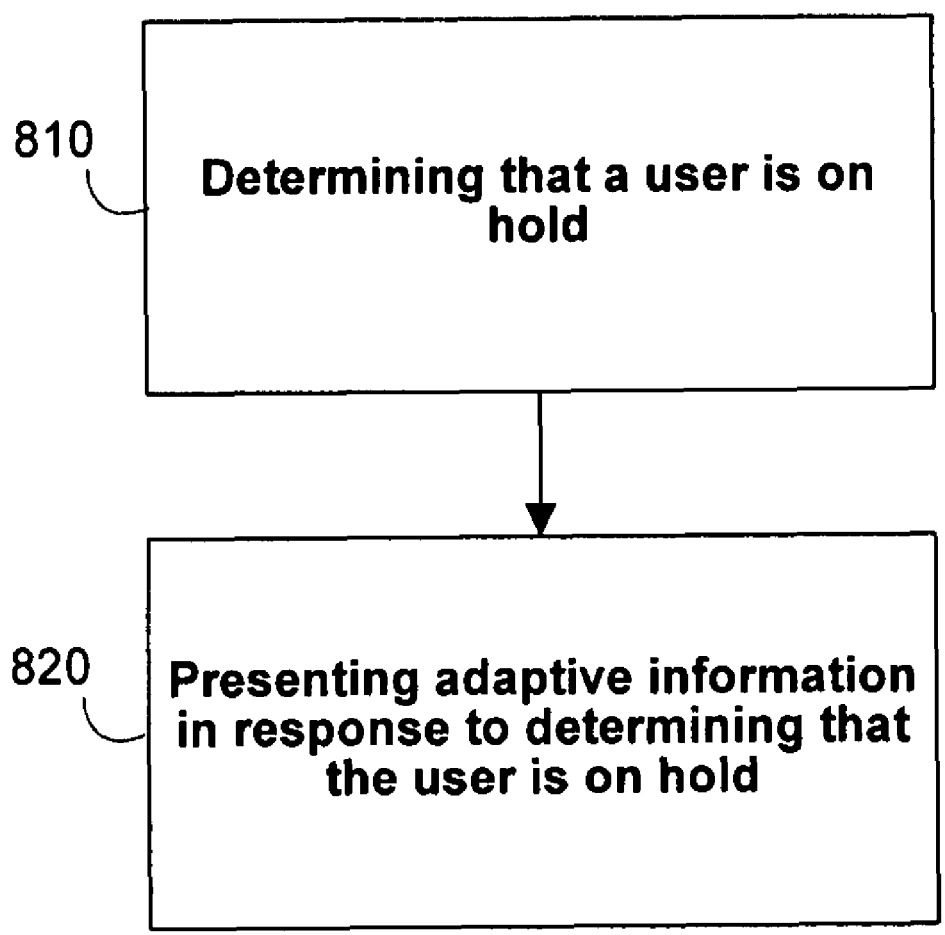
FIG. 8 is a flowchart of another illustrative process for presenting adaptive information in accordance with an embodiment of the present invention.

FIG. 8 shows a flowchart of method 800 for presenting adaptive information to a user of a communications system while the user is on hold in accordance with an embodiment of the present invention. At step 810, it can be determined that a user is on hold. It can be automatically determined that a user is on hold or it can be determined that a user is on hold through a user input. At step 820, adaptive information can be presented in response to determining that the user is on hold. The adaptive information can, for example, be presented audibly or graphically.

Figure 9:
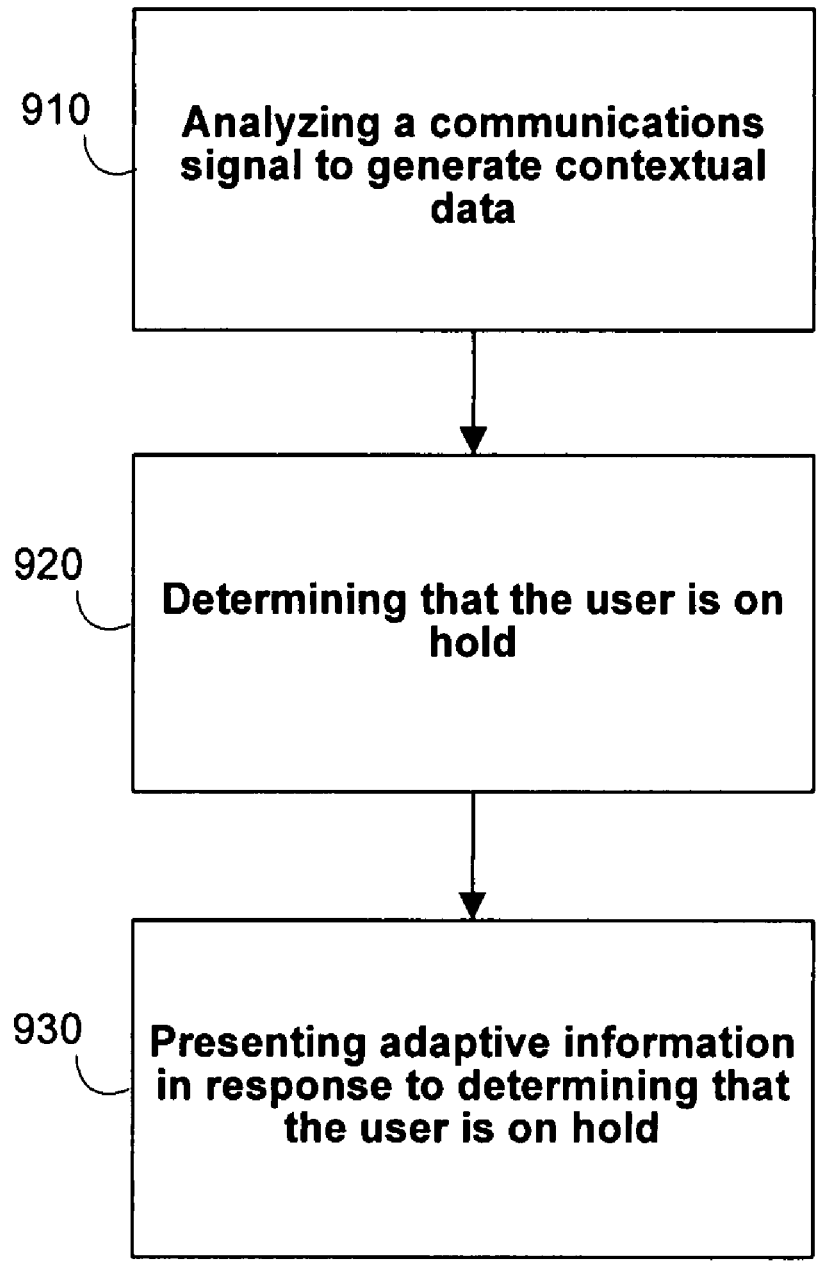
FIG. 9 is a flowchart of another illustrative process for presenting adaptive information in accordance with an embodiment of the present invention.

FIG. 9 shows a flowchart of method 900 for presenting adaptive information to a user of a communications system while the user is on hold in accordance with an embodiment of the present invention. At step 910, a communications signal can be analyzed to generate contextual data. A signal can be analyzed by, for example, identifying keywords from the communications signal. At step 920, it can be determined that a user is on hold. At step 930, adaptive information can be presented in response to determining that the user is on hold. The adaptive information can be based on predetermined selection criteria and the contextual data.

Figure 10:
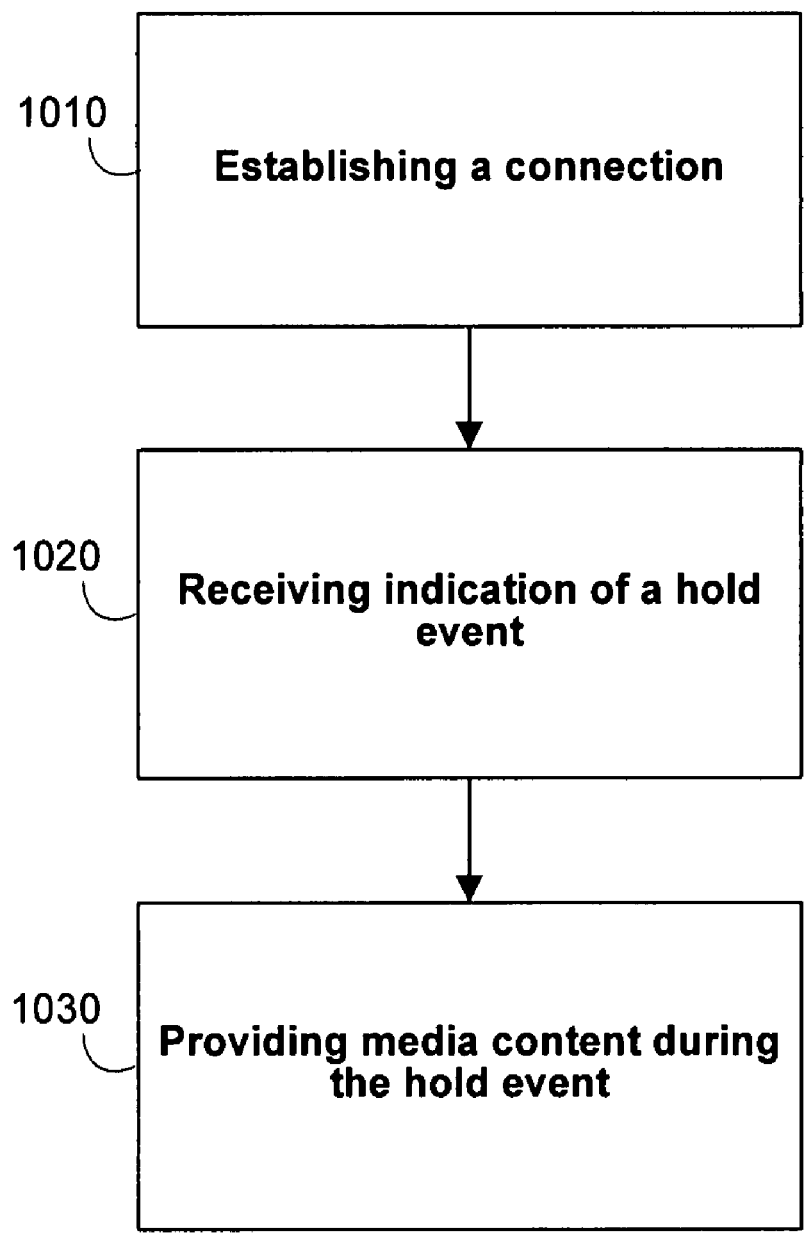
FIG. 10 is a flowchart of another illustrative process for presenting adaptive information in accordance with an embodiment of the present invention.

FIG. 10 shows a flowchart of method 1000 for using a communications device to provide adaptive information during a hold event. At step 1010, a connection can be established. At step 1020, indication of a hold event can be received. At step 1030, media content can be provided during the hold event. Media content can be provided locally from the device. A device can, for example, include storage circuitry that can store media content. Alternatively, media content can be retrieved from a source that is remote to the device. For example, another communications device or a communications server can send media content to the device.

It is understood that the principles of the present invention are not limited to the communications systems described in the discussions above and can be applied to any type of communications system or connection.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A method performed in a cellular telephone of a user for presenting user-specific adaptive information to the user while the user is on hold, the method comprising:
   determining that the user is on hold;
   identifying a party that put the user on hold;
   selecting user-specific adaptive information from a data storage in the user's cellular telephone based on identification of the party, wherein the user-specific adaptive information includes at least one of personal information about the party, information in the user's calendar about the party, and information about a previous communication between the user and the party; and
   presenting the user-specific adaptive information to the user in response to determining that the user is on hold.

2. The method of claim 1, further comprising:
   determining that the user is no longer on hold; and
   terminating presentation of the user-specific adaptive information in response to determining that the user is no longer on hold.

3. The method of claim 1, wherein the determining comprises determining that the user is on hold while connected to a node and the method further comprises:
preventing the node from ending the on hold status until the user-specific adaptive information has been presented.

4. The method of claim 1, wherein determining that the user is on hold comprises monitoring received audio from the party for sound which indicates that the user has been placed on hold.

5. The method of claim 1, wherein determining that the user is on hold comprises monitoring received audio from the party for a frequency component which indicates when the user is on hold.

6. The method of claim 1, wherein the user-specific adaptive information is music.

7. The method of claim 1, wherein the user-specific adaptive information is presented audibly.

8. The method of claim 1, wherein the user-specific adaptive information is presented graphically.

9. The method of claim 2, wherein determining that the user is no longer on hold comprises monitoring received audio from the party for sound which indicates that the party has taken the user off hold.

10. The method of claim 2, wherein determining that the user is no longer on hold comprises monitoring received audio from the party for a frequency component which indicates when the user is no longer on hold.

11. A method performed in a cellular telephone of a user for presenting user-specific adaptive information to the user while the user is on hold, the method comprising:
analyzing received audio to generate contextual data;
determining that the user is on hold;
identifying a party that put the user on hold; and
presenting user-specific adaptive information from a data storage in the user's cellular telephone to the user in response to determining that the user is on hold, wherein the user-specific adaptive information is based on the contextual data and on identification of the party, and includes at least one of personal information about the party, information in the user's calendar about the party, and information about a previous communication between the user and the party.

12. The method of claim 11, further comprising:
determining that the user is no longer on hold; and
terminating presentation of the user-specific adaptive information in response to determining that the user is no longer on hold.

13. The method of claim 11, wherein analyzing received audio comprises identifying keywords.

14. The method of claim 11, wherein the contextual data comprises:
keywords;
number of occurrences of each keyword; and
the most recent time that each keyword was identified in the received audio.

15. A cellular telephone comprising:
communications circuitry operable to communicate with other devices;
processor circuitry operable to identify one of the other devices that put a user of the cellular telephone on hold and to select user-specific adaptive information from a data storage in the user's cellular telephone based on identification of a party associated with the other device, wherein the user-specific adaptive information includes at least one of personal information about the party, information in the user's calendar about the party, and information about a previous communication between the user and the party; and
user interface circuitry operable to present at least a portion of the user-specific adaptive information to the user while the user is on hold.

16. The device of claim 15, further comprising:
storage circuitry operable to store user-specific adaptive information which can be selected by the processor circuitry.

17. The device of claim 15, wherein the communications circuitry is operable to determine if a user of the device is on hold.

18. The device of claim 15, wherein the processor circuitry is operable to determine if a user of the device is on hold.

19. A communications system comprising:
a cellular telephone operable to identify a communications device that put the cellular telephone on hold and to present user-specific adaptive information to a user of the cellular telephone from a data storage in the user's cellular telephone in response to the user being on hold, wherein the user-specific adaptive information is selected based on identification of a party associated with the communications device and includes at least one of personal information about the party, information in the user's calendar about the party, and information about a previous communication between the user and the party;
a communications network operable to communicate with a plurality of communications devices; and
the communications device operable to communicate with the cellular telephone.

20. The system of claim 19, wherein the communications network is a cellular telephone network and the communications device is a cellular telephone.

21. The system of claim 19, wherein the cellular telephone comprises storage circuitry operable to store user-specific adaptive information.

22. A method for using a cellular telephone to provide user-specific adaptive information during a hold event, the method comprising:
establishing a connection between the cellular telephone and a second device;
receiving indication of a hold event from the second device; and
providing media content to a user of the cellular telephone from a data storage in the user's cellular telephone during the hold event based on identification of a party associated with the second device, and wherein the media content includes at least one of personal information about the party, information in the user's calendar about the party, and information about a previous communication between the user and the party.

* * * * *